United States Patent [19]
Carew

[11] 3,922,941
[45] Dec. 2, 1975

[54] CAB STACKER AND MOBILE WORK STATION

[76] Inventor: Victor E. Carew, 610 W. Taylor Run Parkway, Alexandria, Va. 22314

[22] Filed: Aug. 13, 1974

[21] Appl. No.: 497,012

Related U.S. Application Data

[63] Continuation-in-part of Ser. No. 364,388, May 29, 1973, abandoned.

[52] U.S. Cl. ................. 83/417; 83/465; 83/792; 83/928
[51] Int. Cl.² .. B23Q 7/04; B26D 7/06; B23D 47/04
[58] Field of Search ............. 83/417, 928, 792, 465

[56] References Cited
UNITED STATES PATENTS

| | | | |
|---|---|---|---|
| 3,330,175 | 7/1967 | Bridges | 83/417 X |
| 3,519,042 | 7/1970 | Domres | 89/928 UX |
| 3,685,211 | 8/1972 | Marchand | 83/417 X |

*Primary Examiner*—J. M. Meister
*Attorney, Agent, or Firm*—R. S. Sciascia; P. Schneider

[57] ABSTRACT

A warehouse system and method for stacking, storing and retrieving material includes a cab stacker that can be mounted on the mast of a stacker, preferably a twin-cab stacker, crane or sideloader. The twin cab functions as a mobile work-station which can retrieve materials from a storage area, cut them to order, bundle them, and place them directly on a conveyor system for packing and ultimate shipment. The twin cab includes a plurality of forks mounted on a carriage which is connected to a telescoping mast on the cab. The forks can be employed as a lift or support for materials removed from cantilever or pigeon-hole racks. Automatic stops align the cab with a selected rack. The cab also may support a ledge-fence on which elongated materials can be placed for cutting by a swing-arm mounted, cutting wheel which is controlled by an automatic feed mechanism. Tape dispensers in the cab provide tape for bundling the cut materials. Sheet and elongated materials are transferred directly from the forks to conveyors. A vacuum transfer machine is employed in packing the sheet materials.

36 Claims, 8 Drawing Figures

CAB STACKER AND MOBILE WORK STATION

This is a continuation-in-part of application Ser. No. 364,388 filed May 29, 1973, now abandoned.

BACKGROUND OF THE INVENTION

The present invention relates generally to warehouse systems and more particularly to a warehouse system employing a cab stacker device capable of handling unit loads of elongated and sheet materials and acting as a mobile work-station. (Hereinafter, all references will be to a twin-cab stacker although it is to be noted that the stacker can also be a single cab with a single man therein.) In its capacity as a mobile work-station the stacker is capable of stock-picking individual pieces of elongated material from pigeon-hole or cantilever storage racks and subsequently processing such material on the mobile work-station through a light-duty, cut-off operation when required and other operations such as tagging, identifying, bundling and issuing material to interfacing work stations or conveyances.

Various types of devices are in wide use today that are associated with the attainment of the functions described above. One such device employs a stacker crane with a single cab for a one-man operation. The stacker crane can use different lengths of forks or sliding forks handling unit loads, sheet materials and elongated materials. This approach requires the use of pans to hold elongated materials which are stored in cantilever racks. Warehouse methods employed in the past have not used this type of stacker with relatively cheap pigeon-hole racks, which are desirable for storage of slow-moving, light-weight elongated materials.

Sideloader fork-trucks have also been employed in the past. The trucks are guided through narrow aisles by employing guide rails. As in the case of the single-cab, stacker crane, the standard sideloader fork-truck requires pans for handling and storage of certain elongated materials. Furthermore, sideloaders cannot accommodate the use of pigeon-hole racks. Additionally, since the operator of the sideloader usually remains at floor level as the forks are raised and lowered on the hoist column, the operator's visibility has limitations, since unlike the stacker-crane operator his lift forks do not remain at or near operator eye level. This fact creates difficulty in aligning the forks on the vehicle with the arms on the cantilever racks, a problem which becomes more acute as lift heights increase and limits the height to which side-loader fork-trucks can effectively operate. Sideloaders employed in the past are not capable of using pigeon-hole racks, since their forks are aligned with the central axis of the pigeon-hole racks rather than being perpendicular thereto. In addition, both of the above systems are employed simply to move the material from the racks to separate work areas in the warehouse where cutting, identifying, bundling and issuing material to interfacing work stations or conveyances takes place.

SUMMARY OF THE INVENTION

The present invention overcomes the above disadvantages by employing a warehouse system which includes a twin-cab stacker that functions as a mobile work-station. The stacker can accommodate pigeon-hole racks as well as cantilever racks by its abiliity to rotate 360° in the horizontal plain. Since men travel in the stacker, aligning the forks with adjacent racks is no problem. The stacker can handle all types of items. The twin cab can be mounted on an overhead, stacker-crane, hoist column or placed on the hoist columns of a side-loader. The twin cab acts as a mobile work-station negating any need for carrying individual pieces or unit loads of materials back and forth between storage racks and stationary work stations except when heavy-duty cutting is required at a floor mounted cutting machine. Conveyances and transfer devices in the warehouse provide a semi-automatic delivery system. By converting the stacker into a mobile work-station and employing it with the semi-automatic delivery system, unexpectedly large savings of time and manpower result.

An object of the present invention is to provide a system of cutting, bundling and tagging material immediately after it is withdrawn from a storage rack.

Another object is to increase the efficiency of a warehouse system by providing for direct transfer from the forks of a stacker to a conveyor system.

A further object of the invention is to provide mobility for a work station.

A still further object is to provide a system that can be used with both pigeon-hole and cantilever racks.

Other objects, advantages and novel features of the present invention will become apparent from the following detailed description of the invention when considered in conjunction with the accompanying drawings.

DESCRIPTION OF THE PREFERRED EMBODIMENTS

Figure 1:
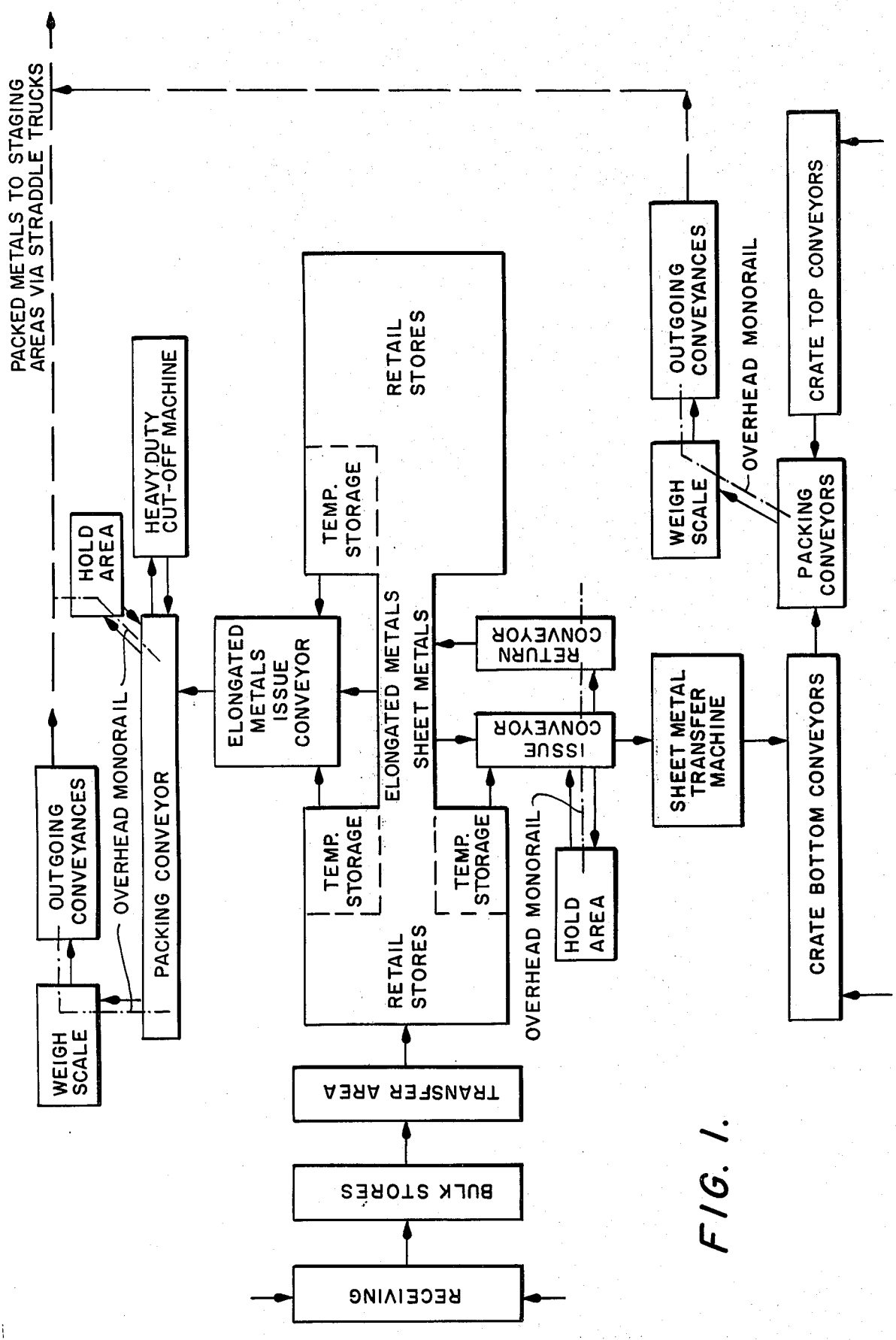
FIG. 1 is a schematic in block-diagram form of a warehouse employing the present invention.

The invention provides a semi-automated materials handling system for the efficient receipt, storage and issue of materials. The system is designed to supplement and optimize the utilization of the varied and unique stock-replenishment, order-picking, metal-cutting and issue capabilities of the specially designed two-man, twin-cab, stacker crane or sideloader. Fig. 1 illustrates in block diagram form a flow chart for materials in the warehouse system of the present invention. Materials are first placed in the receiving section where they are moved by a bridge crane (not shown) to either a bulk storage or transfer area. Materials in the bulk storage area or transfer area are then lifted and moved by the improved stacker crane or sideloader to cantilever or pigeon-hole racks in the retail storage area. Fork lift trucks may be employed to move pallet loads to other storage areas. As orders are received, material is picked from the retail storage area racks and issued to either an elongated-material packing area or a sheet packing area. In the elongated-materials packing area the stores picked from the racks by the stacker crane or sideloader are placed on an elongated-metal, issue conveyor. The metal issue conveyor may include five, parallel, linked conveyors which are controlled by two packers. Other suitable conveyor systems may be employed, however. To avoid any delays caused by waiting to get on the packing lines and to allow for second-shift operations of the stacker crane or sideloader, the materials may be placed in temporary storage areas located adjacent to the conveyor. The temporary storage space is used to accumulate a sufficient supply of picked, elongated orders, before changing forks on the stacker crane or sideloader for retrieving sheet items. From the issue conveyor the elongated materials move to a packing conveyor on which they are packed. When the elongated items have been completely packed on the packing conveyor, they are lifted and moved by a hoist on a monorail system to an overhead weigh scale. After the items have been weighed, they are placed on outgoing conveyances for eventual shipment to their destination. Another hold area is provided adjacent the packing conveyor to accumulate material if operations become heavy. In addition, a heavy duty cut-off machine is located adjacent the packing conveyor for performing cut-off operations that the stacker crane or sideloader cannot perform.

Sheet materials are also picked up from cantilever racks by the stack crane or sideloader and either placed in a temporary storage area or transferred to a sheet-metal, issue conveyor. The sheet-metal issue conveyor may include three parallel, gravity-roller conveyors which slope downward toward the vacuum lift and transfer machine, which may be a vacuum lifting device of known construction. This machine will pick up single sheets or sheet bundles and transfer them to a crate bottom on the crate-bottom conveyor. Crate tops are placed on the crate-top conveyor and moved onto the crate bottoms which are placed on packing conveyors. The crate top is placed over the sheets for a strapping operation. The strapped and crated sheets are then lifted and moved by a hoist on a monarail system onto an overhead weigh scale. After the items have been weighed they may be placed in a temporary holding area or transferred to outgoing conveyances for shipment to their destination. The residue sheets are not picked, are transferred by monorail hoist to a temporary hold area or placed on three tandem, gravity-roller conveyors which slop downward toward the stacker or sideloader pick-up area. The gravity-roller conveyors permit temporary storage capabilities on the conveyors themselves; however, other suitable conveyance systems may be employed. This method of temporary storage will minimize the number of times that the stacker crane or sideloader will be required to flip and change the forks in order to move the sheets from storage racks to the conveyors and back from the conveyors to the storage racks.

Figure 2:
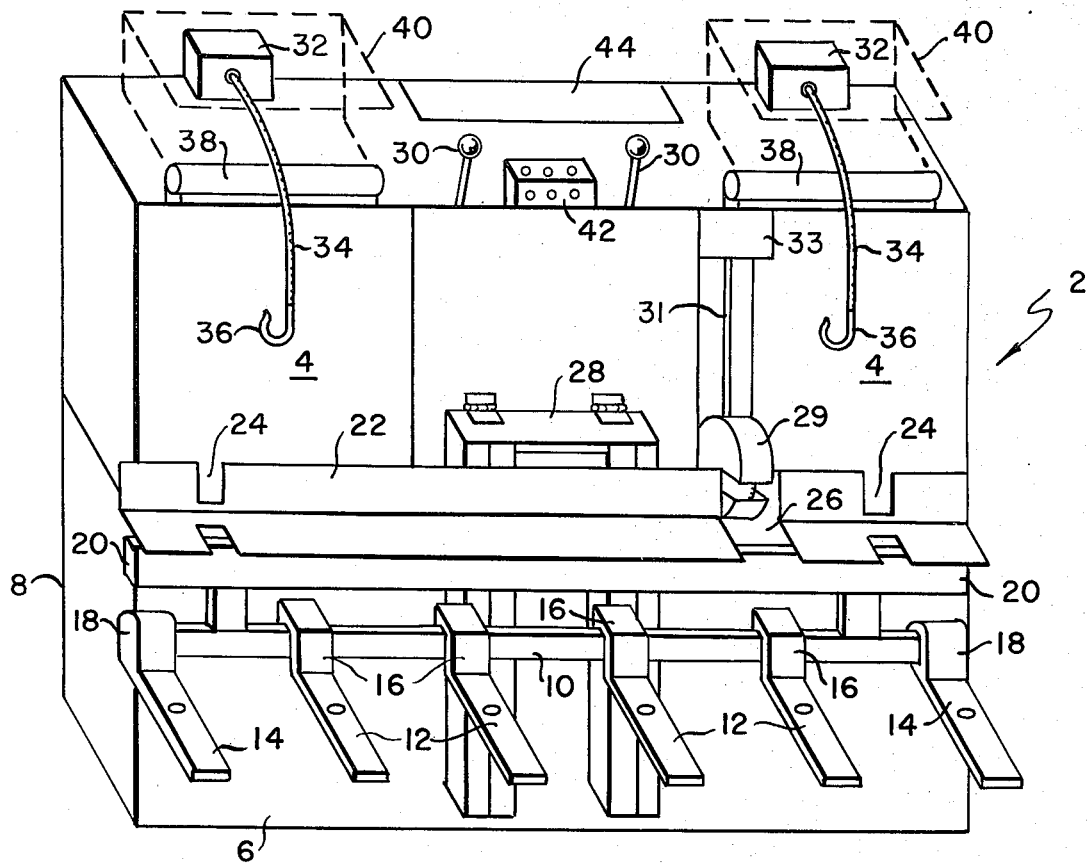
FIG. 2 is a view in perspective of the twin-cab stacker and mobile work-station.

FIG. 2 illustrates the twin-cab, mobile work-station 2 of the present invention. The twin-cab includes a structural housing 6 enclosing two compartments 4 which have doors 8 at their ends. A fork carriage is mounted on the structural housing 6 and includes a fork bar 10. Removable inner forks 12 are mounted on the fork bar 10. End forks 18 are rotatably connected to the fork bar 10 or, alternatively, can be connected with pins, (not shown) to the bar 10 for quick removal and storage. The forks 12 have an upright heel portion 16 which goes over and behind the fork bar 10 as can better be seen in FIG. 5. The forks 12 and 14 each have a horizontal tine and in the configuration shown are preferably 24 inches long and are employed to move elongated materials. For sheet materials the two end forks 14 are either removed or flipped up or down, and the inner four forks 12 are exchanged for longer, rubber-coated forks for handling sheet material. These sheet-material forks are preferably 42 inches long. The fork bar 10 is connected to a second bar 20 which may support a ledge-fence 22. Alternatively, the ledge-fence may be mounted directly on the twin cab housing 6. The ledge-fence 22 has slots 24 and 26. The slots 24 are employed with a holding device which will be described subsequently. The slot or break 26 in the ledge-fence 22 cooperates with a cutting wheel 29 that is mounted on an adjustable-length, swing arm 31 which is connected to an automatic feed mechanism 33 mounted in the top of one of the compartments 4. The entire fork carriage is connected to a telescoping mast structure 28 of known design which is powered by a motor (not shown). Spotlights 30 are shown on top of the twin cab for lighting the rack area. Two winches 32 with cables 34, and hooks 36 are provided on the top of the cab. The cables 34 pass over rollers 38 on top of the cab. Separate winch controls (not shown) are provided for each operator. The winches are used for lifting heavy or bulky materials out of cantilever racks and onto the forks. Winches may also be mounted on the side of the cab for assisting in pulling elongated material from pigeon-hole racks. Protective hoods 20, indicated by broken lines, may be located on the top of the twin cab. The hoods may be mounted in slots, on rails or pivoted on hinges and either manually or automatically actuated when the operators must reach out of the compartments 4. Electronic stops 42 are located on the cab. These stops provide for automatic positioning of the cab with respect to the racks. These stops may include retro-reflectors which are commonly used in automatic elevators to align and stop the elevator at the desired floor. Since these systems are well known, an exact description of their installation in the present system is unnecessary. An opening 44 is shown in the top of the twin-cab. A hoist column that may have telescoping capabilities passes through this opening and is connected to the cab.

Figure 3:
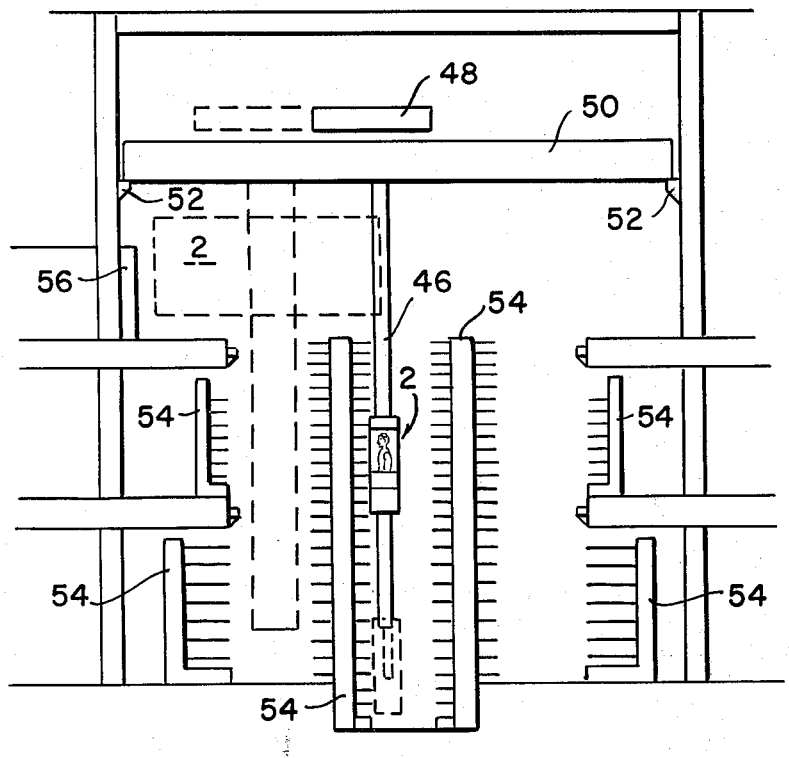
FIG. 3 is a schematic, cross-sectional view of one possible rack arrangement.

FIG. 3 is a schematic illustrating the use of the twin-cab and mobile work-station 2 as a stacker crane. The twin-cab and mobile work-station 2 is mounted on a hoist column 46 of known construction. The hoist column 46 is connected to a trolley 48 which contains a motor and turntable. Alternatively, the turntable may be located on the top of the cab where the hoist column is connected to the cab at 44. The trolley moves across a bridge 50 of known construction. The bridge 50 is movable along two parallel tracks 52. Movement of the bridge 50 and trolley 48 allow the stacker crane to be positioned for material pick-up. The retail storage area includes both cantilever racks 54 and pigeon-hole racks 56. In addition, storage area may be provided for pallet loads when desirable. The powered turntable enables the twin cab to be rotated 360°. For pick-up of elongated material stored on the cantilever racks 54 the front of the cab faces the racks 54. For pick-up of elongated material stored in the pigeon-hole racks 56 the face of the cab is parallel with the elongated passageways defined by the pigeon-hole racks 56 as shown by the broken lines in FIG. 3. Automatic stops similar to those employed in the present modern elevators may be placed on the cantilever or pigeon-hole racks and cooperate with automatic stop 42 on the cab to properly align the twin-cab forks with the rack arms.

Figure 4:
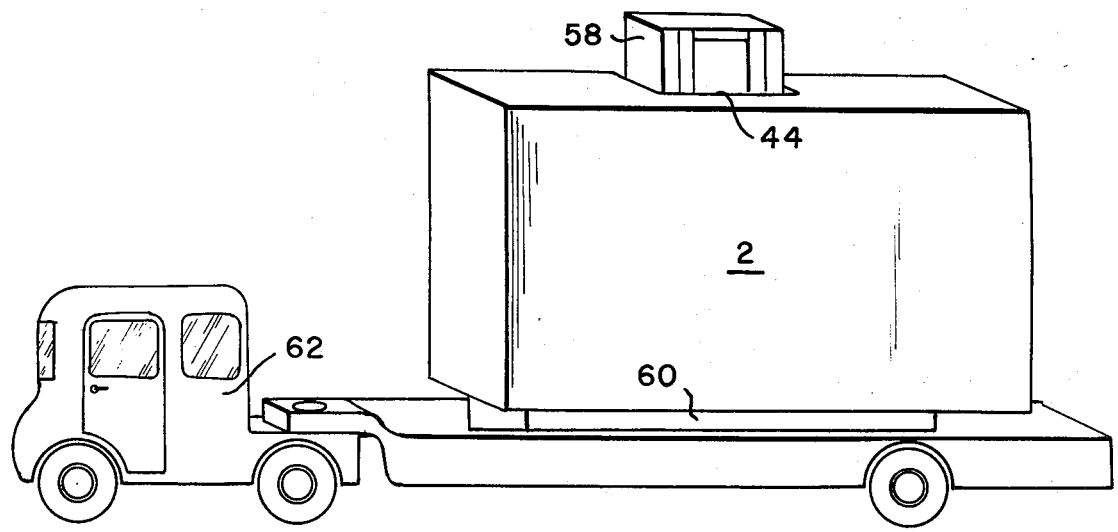
FIG. 4 is a schematic of a twin-cab stacker and mobile work-station in a sideloader configuration.

Alternatively, the twin-cab and mobile work-station 2 may be mounted in the sideloader configuration illustrated diagrammatically in FIG. 4. In FIG. 4 the twin cab is mounted on a powered tuntable 60 which, in turn, is mounted on a powered vehicle 62. A hoist column 58 of known construction is employed to lift the cab. The turntable 60 allows for alignment of the cab with pigeon-holes when desired.

A third alternative, which is not depicted, includes both rails above and below the cab. A support column would extend between the rails on the floor and those above, on which column the cab would be mounted. Suitable hoists are employed to raise and lower the cab on the support column. Employing rails above and below eliminates structural problems.

Figure 5:
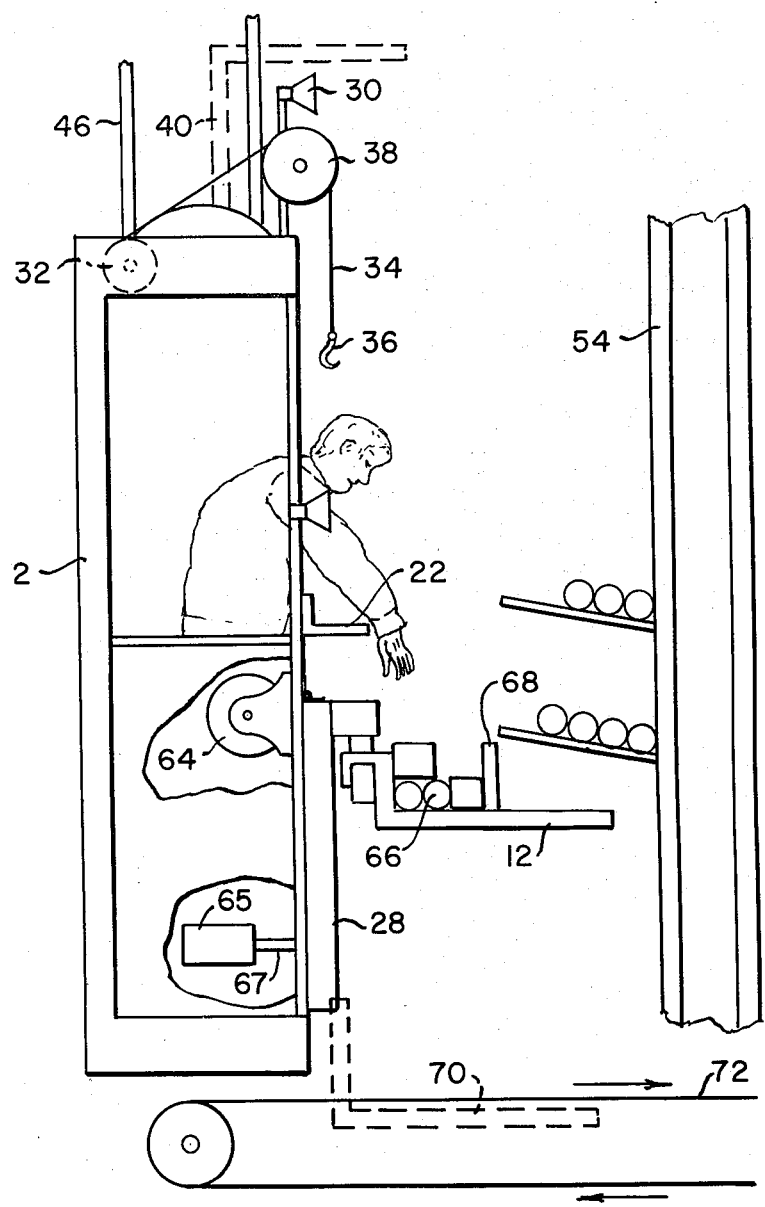
FIG. 5 is a side view of the twin-cab stacker and mobile work-station.

FIG. 5 which is another view of the twin-cab and mobile work-station 2 shows the cab in a typical working position. The electronic stops on the cab and the racks have been aligned. For light materials each operator simply reaches out from his compartment and picks the material off of the racks and puts it in a working pocket 66 as seen in an end view of the cab structure. The pocket is defined by pins 68 which can be placed in the forks 12 by the upright ends of the forks 12 nearest the cab structure and by the sections of the tines between the fork-ends and the pins. If desired, a longitudinal plate of material can be laid between the upright heels and the pins 84 to form a flooring. Tape dispensers 64 are located in each of the compartments and provide nylon-filament tape to wrap the elongated materials that are to be issued. The tape can also be used to affix residual short lengths of elongated materials to longer lengths in the storage racks to prevent their falling from cantilever or pigeon-hole racks. As illustrated in FIG. 5 the winches 32 may be located inside the twin-cab.

As shown in FIG. 5, the telescoping mast on which the fork carriage is mounted may be affixed by hinges at its top to the housing of the cab. An hydraulic cylinder 65 mounted in the cab has an armature 67 connected to the lower part of the mast 28. Actuation of the cylinder causes the mast and thus the fork carriage to rotate slightly to tilt the forks upward. This tilting ability may help in removing materials from racks and in holding materials on the forks.

When suitable amounts of materials have been accumulated on the forks, the crane is moved to one of the conveyor systems. Each conveyor system has a plurality of parallel conveying devices 72 spaced at predetermined distances so that when the fork carriage is lowered the forks, when properly aligned, will pass between the parallel conveying devices and the material on the forks will be transferred directly to the conveyor as illustrated by the phantom fork 70 in FIG. 5. This alignment can be accomplished automatically using retro-reflectors as described above.

Figure 6:
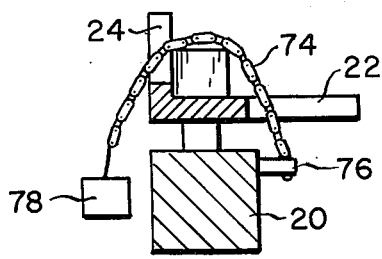
FIG. 6 is a cross-sectional view of the support device employed in the invention.

FIG. 6 is a cross section of the ledge-fence 22 taken at one of the slots 24. Material to be cut is placed on the ledge-fence 22 which has a graduated scale for measuring the proper amount of material. A chain 74, having a stud 76 thereon, is placed over the material and the stud 76 is placed in the slot in the horizontal portion of the ledge-fence 22. An hydraulic or pheumatic motor 78, toggle clamp or other suitable device is employed to tighten the chain 74 around the material to be cut. Another such chain is located at the other slot 24. The stud 76 is too large to pass through the slot 24 in the horizontal portion of the ledge-fence 22.

Figure 7:
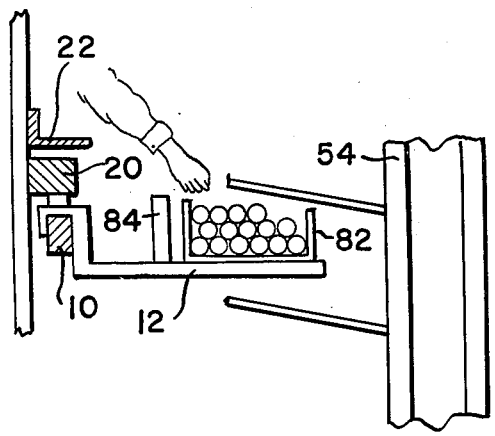
FIGS. 7 and 8 illustrate two methods of removing materials from the racks and onto the forks.
Figure 8:
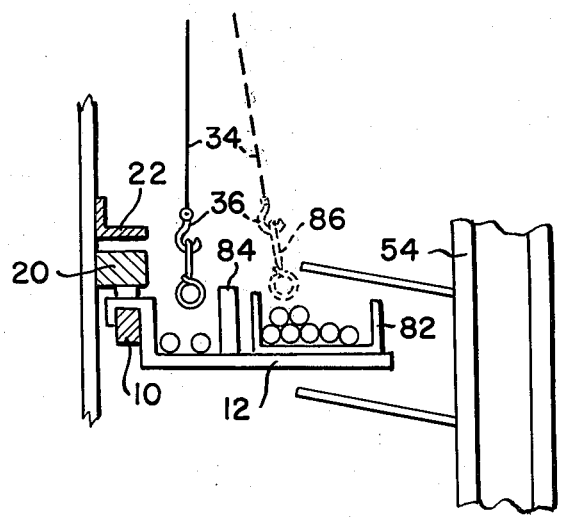

FIGS. 7 and 8 illustrate how the stacker crane can be employed to lift materials that must be stored in pans 82. Pans are employed for material that lacks suitable rigidity or is round. Initially the forks are aligned with the cantilever rack 54. After alignment the forks are moved under the pan 82 to be lifted. The mast 28 on the cab is then activated to lift the forks 12 and the pan 82 from the rack. The forks can then be moved back from the racks 54 for manual lifting of materials by the operators as illustrated in FIG. 7, or for heavier material, the winch cables 34 and hooks 36 can be employed with a choker hitch 86 to lift the material from the pan 82 and place it in the pocket on the forks.

It should further be noted that various other automatic as well as mechanical stops can be positioned along the bridge 50, hoist 46 and parallel tracks 52 to assist with alignment of the twin cab. Moreover, additional spotlights and warning lights may be located on the cab. Although the system has special utility in a metal-storage warehouse, it could easily be employed to handle various other materials and loads.

Obviously, many modifications and variations of the present invention are possible in light of the above teachings. It is therefore to be understood that, within the scope of the appended claims, the invention may be practiced otherwise than as specifically described.

What is claimed is:

1. A twin cab comprising:
   a housing structure;
   at least two compartments within the housing structure;
   a fork carriage mounted on the housing;
   a cutting support mounted on the housing; and
   cutting means mounted on said housing cooperating with said cutting support for cutting material placed on said support.

2. The twin cab of claim 1 further including mounting means connected to said cutting means for supporting said cutting means both within and outside said housing.

3. The twin cab of claim 2 wherein said mounting means comprises an automatic feed mechanism connected to the housing structure and a swing arm connected to the automatic feed mechanism at one end and the cutting means at its other end.

4. The twin cab of claim 2 wherein the cutting support comprises a ledge-fence having a horizontal and vertical surface connected to form a right angle.

5. The twin cab of claim 4 further comprising means for holding material to be cut on said ledge-fence.

6. The twin cab of claim 5 wherein said holding means comprises a plurality of slots in said ledge-fence and means cooperating with said slots for holding material to be cut on said ledge-fence.

7. The twin cab of claim 5 further comprising at least one winch mounted on the housing structure and a line attached to said winch for lifting heavy material.

8. The twin cab of claim 7 wherein said fork carriage is mounted on a telescoping mast structure and said telescoping mast structure is mounted on said housing.

9. The twin cab of claim 8 further including means for tilting said fork carriage mounted on the housing structure.

10. The twin cab of claim 8 further including dispensing means mounted on the housing structure for providing bundling material.

11. The twin cab of claim 1 wherein the cutting support comprises a ledge-fence having a horizontal and vertical surface connected to form a right angle.

12. The twin cab of claim 11 further comprising means for holding material to be cut on said ledge-fence.

13. The twin cab of claim 12 wherein said holding means comprises a plurality of slots in said ledge-fence and means cooperating with said slots for holding material to be cut on said ledge-fence.

14. The twin cab of claim 13 wherein said means cooperating with said slots comprises at least one line having a stud larger than the slots on one end, a motor connected to the other end of said line and mounted on the housing structure, whereby the stud may be placed on one side of the slot and the motor actuated to tighten the line which passes through the slot.

15. The twin cab of claim 1 further comprising at least one winch mounted on the housing and a line attached to said winch for lifting heavy material.

16. The twin cab of claim 1 wherein said fork carriage is mounted on a telescoping mast structure on said housing.

17. The twin cab of claim 16 further including means mounted on the housing structure for tilting said fork carriage.

18. A twin-cab stacker and mobile work-station comprising:
   a housing having at least dual compartments;
   a fork carriage telescopically mounted on said housing;
   a plurality of forks removably mounted on said fork carriage;
   an elongated support mounted on said housing, portions of said support being adjacent to said compartments;
   cutting means mounted in at least one of said compartments for cutting material placed on said support; and
   means for moving said housing from one position to another.

19. The twin-cab stacker and mobile work-station of claim 18 further including at least two forks rotatably mounted on said fork carriage.

20. The twin-cab stacker and mobile work-station of claim 18 wherein said housing moving means comprises:
   a pair of parallel tracks elevated above the ground;
   a bridge between said tracks;
   a trolley movable along said bridge;
   a telescoping mast connected to said trolley and said housing; and
   motor means for driving said bridge, trolley and telescoping mast.

21. The twin-cab stacker and mobile work-station of claim 20 further comprising means for automatically stopping said housing when it has reached a predetermined position.

22. The twin-cab stacker and mobile work-station of claim 20 wherein said cutting means comprises:
   an automatic feed mechanism mounted on the housing;
   a swing arm connected to the automatic feed mechanism at one end; and
   a cutting wheel connected to the other end of the swing arm.

23. The twin-cab stacker and mobile work-station of claim 20 further including mounting means for supporting said cutting means both inside and outside said housing.

24. The twin-cab stacker and mobile work-station of claim 23 wherein the elongated support comprises a ledge-fence.

25. The twin-cab stacker and mobile work-station of claim 24 further comprising:
   means cooperating with said elongated support for holding material to be cut on said elongated support; and
   dispensing means mounted within said housing for providing bundling material.

26. The twin-cab stacker and mobile work-station of claim 18 wherein said moving means comprises:
   a vehicle;
   a telescoping mast mounted on said vehicle and connected to said housing; and
   motor means for driving said vehicle and said mast.

27. The twin-cab stacker and mobile work-station of claim 26 further including a turntable mounted on said vehicle, said mast being mounted on said turntable and said motor means being connected to said turntable for moving said turntable.

28. The twin-cab stacker and mobile work-station of claim 26 further comprising means for automatically stopping said housing when it has reached a predetermined position.

29. The twin-cab stacker and mobile work-station of claim 26 wherein said cutting means comprises:
   an automatic feed mechanism mounted on the housing;
   a cutting wheel; and
   a swing arm connected at one end to the feed mechanism and at the other to the cutting wheel.

30. The twin-cab stacker and mobile work-station of claim 26 further including mounting means for supporting said cutting means both inside and outside said housing.

31. The twin-cab stacker and mobile work-station of claim 30 wherein the elongated support comprises a ledge-fence.

32. The twin-cab stacker and mobile work-station of claim 31 further comprising:
   means cooperating with said elongated support for holding material to be cut on said elongated support; and
   dispensing means mounted on said housing for providing bundling material.

33. In a warehouse having a plurality of cantilever and pigeon-hole racks the improvement comprising:
   a twin cab structure;
   a fork carriage movably mounted on said structure;
   a plurality of forks mounted in a predetermined spaced relation on said fork carriage;
   an elongated support means mounted on said structure for supporting material to be cut;
   cutting means mounted on said structure for cutting material placed on said support means; and
   means for moving said twin cab structure.

34. A cab stacker comprising:
   a housing structure;
   at least one compartment within the housing structure;
   a fork carriage mounted on the housing;
   a cutting support mounted on the housing; and
   cutting means mounted on said housing cooperating with said cutting support for cutting material placed on said support.

35. The cab stacker of claim 34 wherein the cutting support comprises a ledge-fence having a horizontal and vertical surface connected to form a right angle.

36. The cab stacker of claim 35 further comprising means for holding material to be cut on said ledge fence.

* * * * *